Sept. 20, 1971     P. A. KLANN     3,605,546
ROLLER VALVE DEVICE

Filed May 15, 1970     3 Sheets-Sheet 1

INVENTOR
PAUL A. KLANN

ATTORNEYS

Sept. 20, 1971   P. A. KLANN   3,605,546
ROLLER VALVE DEVICE

Filed May 15, 1970   3 Sheets-Sheet 2

INVENTOR
PAUL A. KLANN

BY  Sughrue, Rothwell, Mion,
    Zinn & Macpeak

ATTORNEYS

Sept. 20, 1971    P. A. KLANN    3,605,546
ROLLER VALVE DEVICE
Filed May 15, 1970    3 Sheets-Sheet 3

INVENTOR
PAUL A. KLANN

BY Sughrue, Rothwell, Mion, Zinn & Macpeak
ATTORNEYS

United States Patent Office 3,605,546
Patented Sept. 20, 1971

3,605,546
ROLLER VALVE DEVICE
Paul A. Klann, P.O. Box 2398,
Waynesboro, Va. 22980
Filed May 15, 1970, Ser. No. 37,619
Int. Cl. G10b 3/06
U.S. Cl. 84—336
10 Claims

ABSTRACT OF THE DISCLOSURE

The roller valve device minimizes the sliding friction in the operation of the valve by locating two rollers between a pair of guide surfaces which are spaced apart a difference less than the sum of the diameters of said rollers and wrapping a flexible resilient band under tension about said rollers in an S-shaped configuration to define a freely rotatable cluster. One side of the cluster is exposed to air under pressure and the valve passage is located in one of the guide surfaces. Upon controlled movement of the cluster between the guide surfaces, the band may be selectively displaced between a non-sealing position with respect to the valve passage to control the flow of air pressure through said valve passage.

BACKGROUND OF THE INVENTION

Field of the invention

The present invention relates primarily to the Rolamite principle and more specifically to means for controlling the movement of the roller cluster in a valving arrangement as for example a check valve for an organ.

Prior art

The basic Rolamite principle in terms of a design concept is well known in the art and involves basically two parallel guide surfaces, a flexible band and an even number of rollers which define a freely rotatable cluster of rollers movable between guide surfaces with substantially no sliding friction. Although numerous modifications of the basic elements of the Rolamite device have been made in order to vary the operational characteristics of the device, no structure has been devised incorporating the Rolamite principle which is capable of use as a valve for controlling air pressure, especially a valve suitable for use in a pipe organ.

SUMMARY OF THE INVENTION

The present invention is directed to a valve suitable for use in a pneumatic pipe organ and which incorporates the Rolamite principle. The valve comprises a plurality of adjacent rotatable members, a guideway having spaced apart walls for supporting and restraining said rotatable members, said walls being spaced from each other a distance less than the sum of the diameters of said members, and resilient band means secured under tension between said walls. A portion of said band means is wrapped about the rotatable members to form a free rolling cluster. One end of the guideway is disposed in communication with a source of air under pressure and the other end of the guideway is closed by means of a valve for selectively admitting air under pressure to the opposite side of the cluster of rollers. A valve passageway extends through one wall of the guideway so that when the roller cluster is disposed adjacent one end of the guideway the band will be disposed across the valve passageway in sealing relationship and when the roller cluster is disposed at the opposite end of the guideway, the valve passage will be disposed in communication with the open end of the guideway.

The present invention is further directed to suitable arrangements for returning the roller cluster to the end of the guideway wherein the valve passage will be closed subsequent to the balancing of air pressures on opposite sides of said cluster.

The present invention is also directed to means for connecting a plurality of cluster arrangements together for conjoint operation. These and other objects of the invention will be set forth more fully in the following specification with reference to the accompanying drawings.

DETAILED DESCRIPTION OF THE INVENTION

Figure 1:
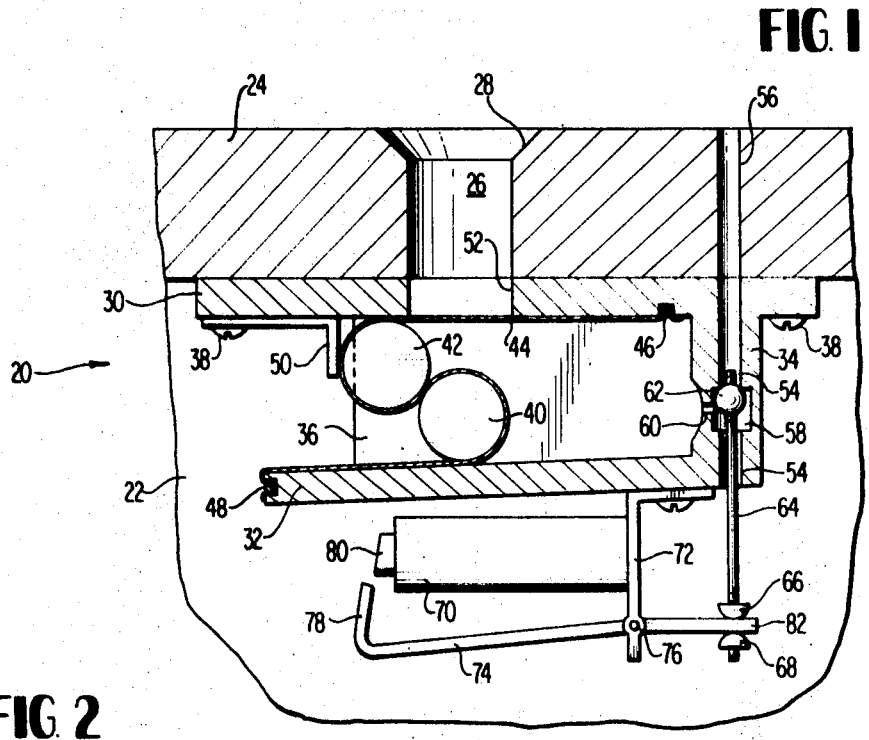
FIG. 1 is a cross-sectional view of one embodiment of the valve construction embodying the Rolamite principle.

The valve 20 shown in FIG. 1 is capable of general utility and numerous applications, one of which is for controlling the flow of air under pressure from the air chest of a pipe organ to the individual pipes for producing sounds. Thus, the valve 20 will be described in conjunction with its use in an organ only by way of example.

The valve 20 may be located within an air chest having suitable enclosing wall structures including side wall 22 and top wall 24. The top wall 24, is provided with an air passage 26 having an outwardly beveled top edge 28 upon which the organ pipe may be mounted. A plurality of air passages 26 may be provided equal in number to the number of pipes in the organ.

The valve is comprised of a top plate 30, a bottom plate 32, one end plate 34 and a pair of side plates 36, only one of which is shown in FIG. 1. The top plate 30 may be secured to the top wall of the air chest by any suitable means such as screws 38. The top and bottom walls 30 and 32 have opposed smooth planar faces which diverge with respect to each other from a point adjacent the end wall 34 to the opposite end thereof. A pair of rollers, 40 and 42 are mounted within the guideway defined by the upper and lower plates 30 and 32 with the axes of the rollers extending perpendicular to the side walls 36. The length of the rollers are substantially equal to the distance between the side walls 36 leaving sufficient clearance for free passage therebetween. The distance between the top plate 30 and the lower plate 32 is in all instances less than the sum of the diameters of the rollers 40 and 42 so that the relative position of the rollers within the guideway will always be maintained. A flexible resilient belt 44 having a width substantially equal to the distance between the sidewalls 36 is secured within the guideway with one end being secured to the top wall 30 at 46 and the other end being secured to the bottom wall 32 at 48 by any suitable means. The belt is wrapped around the rollers 40 and 42 in an S-shaped configuration as shown in FIG. 1 and is secured in the guideway under tension. A suitable stop member 50 may be secured to the valve housing adjacent the open end thereof.

Figure 2:
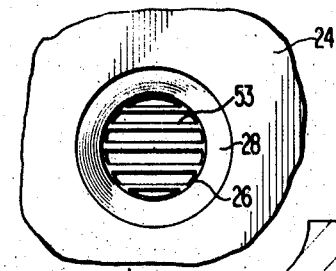
FIG. 2 is a partial top plan view of FIG. 1 showing the valve passage.

A valve opening 52 may be provided in the upper plate 30 in communication with the air passage 26 so as to provide communication between the interior of the valve structure and the air passage 26. A suitable grating 53 as shown in FIG. 2 may be disposed in the opening 52 or may be formed integrally in the wall 30 so as to provide a suitable support for the flexible belt 44 to prevent the same from bowing upwardly into the opening 52. The shape of the opening can also be triangular or square to control the attack or decay. Another air passage 54 is formed in the end wall 34 and is disposed generally perpendicular to the end wall 30 in alignment with an air passage 56 formed in the top wall 24 of the air chest. An enlarged valve chamber 58 is provided intermediate the ends of the passage 54 and a connecting passage 60 is provided intermediate the chamber 58 and the roller chamber of the valve. A ball valve 62 is threadedly secured on the upper end of a valve rod 64 within the chamber 58 and is provided with a diameter greater than the diameter of the passage 54 so as to seat against the passage 54 in either an upper or lower position. The lower end of the valve rod 64 is provided with a pair of adjustable abutments 66 and 68 threaded on the end of the rod. An electro-magnetic coil 70 is secured to the underside of the lower plate 32 by a suitable bracket 72 and an armature 74 is pivotably secured at 76 to the bracket 72. One end 78 of the armature 74 cooperates with the core 80 of the electro-magnet 70 and the other end 82 is disposed intermediate the abutments 66 and 68 on the valve rod 64.

In operation, a positive air pressure is maintained within the air chest by any suitable means well known in the art and if air is not to be admitted to a particular organ pipe the electro-magnet 70 will be de-energized. With the electro-magnet 70 de-energized the weight of the armature 74 will pivot the armature to the position shown in FIG. 1 thereby raising the valve 62 into sealing engagement with the valve seat of the passage 54 leading to the atmosphere. In this position, air pressure from the chest will be admitted through the lower portion of the passage 54, the chamber 58, the passage 60 into the roller chamber to the right of the roller cluster as viewed in FIG. 1. Since the left side of the roller cluster is always exposed to the air pressure within the chest, the pressure will be equaized on opposite sides of the roller cluster. Due to the fact that the upper and lower plates of the valves diverge with respect to each other and since the belt 44 is maintained under tension, the roller cluster will be disposed in engagement with the stop member 50. In this position of the roller cluster the belt 44 is disposed in sealing engagement across the opening 52 to prevent communication between the air chest and the air passage 26 leading to the organ pipe.

When it is desired to admit air under pressure to the organ pipe to produce a musical note, the depression of the appropriate key on the organ console (not shown) will close a switch to energize the electro-magnet 70. The magnetization of the core 80 will attract the end portion 78 of the armature 74 thereby pivoting the armature in a clockwise direction about the pivot point 76. Such a movement will cause the valve 62 to be pulled downwardly into sealing engagement with the valve seat adjacent the lower portion of the air passage 54 thereby venting the air under pressure within the roller chamber to the atmosphere through the passage 60, chamber 58, upper air passage 54 and air passage 56. Thus, the air pressure will be unbalanced on opposite sides of the roller cluster and the cluster will be moved from left to right as viewed in FIG. 1 to uncover the opening 52 and allow air pressure from the chest to pass upwardly from the air passage 26 into the organ pipe. Upon release of the key, the electro-magnet will be de-energized and the roller cluster will return to the position shown in FIG. 1 in the manner described above. Although the valve structure has been described in conjunction with a pipe organ, it is obvious that the valve structure can be used in other different environments wherein the open end of the valve could be closed with an end wall having a conduit passing therethrough into communication with the source of air under pressure and an additional conduit could be provided for supplying air under pressure to the air passage 54. It is also obvious that other means for actuating the valve 62 may be provided such as a direct manually operated or a pneumatic operated linkage connected to the valve rod 64.

Figure 3:
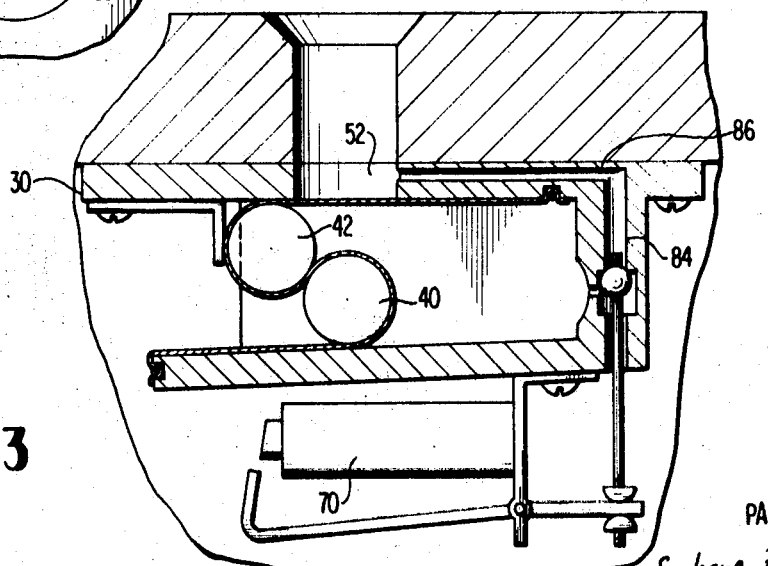
FIG. 3 is a cross-sectional view through another embodiment of the valve embodying the Rolamite principle.

FIG. 3 is directed to a modification which is substantially identical to the modification described above with respect to FIGS. 1 and 2 with the exception of the exhaust passage from the roller chamber in the valve. In this modification, the exhaust passage 84 is not vented directly to the atmosphere, but is provided with an extension 86 which communicates with the open end 52 and the top plate 30 of the valve. Thus, when the electro-magnet 70 is energized upon depression of an organ key, the air under pressure to the right of the roller cluster 40, 42 will pass through the passages 84 and 86 into the opening 52 for ultimate exhaust through the organ pipe associated therewith. This will not affect the sound characteristics of the organ since the exhaust of this air through the organ pipe is insufficient in itself to produce a sound and furthermore the opening 52 will be uncovered almost immediately to allow the passage of a large volume of air under pressure upwardly into the organ pipe.

Figure 4:
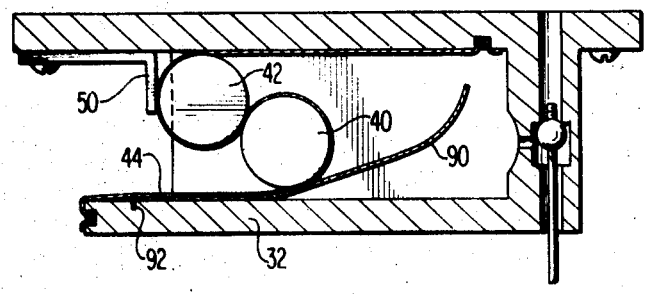
FIG. 4 is a view similar to FIG. 3 showing a modified form of cluster control utilizing spring means.

FIG. 4 shows a modified arrangement for maintaining the roller cluster 40, 42 in engagement with the stop 50 when the electro-magnet 70 is de-energized. A suitable strip of resilient material 90 is secured at 92 to the lower plate 32 beneath the flexible belt 44. The normal curvature of the resilient strip 90 is substantially as shown in FIG. 4 so that upon movement of the roller cluster to the right, strip 90 will merely be depressed into flat overlying relation with respect to the upper surface of the lower plate 32. Upon release of the organ key the air pressure will be equalized on opposite sides of the roller cluster in the manner described above, thus enabling the resilient strip 90 to return to its normal position and thereby shift the roller cluster to the left into engagement with the fixed stop 50.

Figure 5:
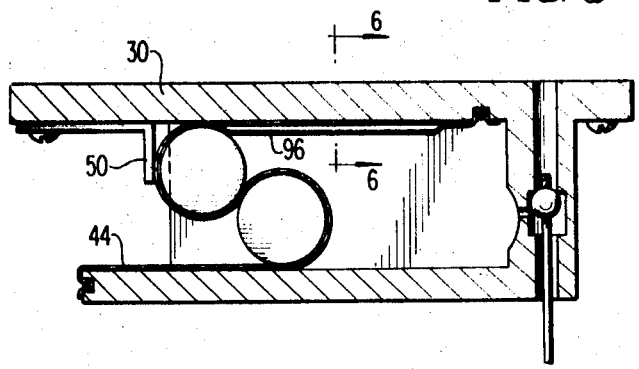
FIG. 5 is a view similar to FIG. 3 showing a cluster control utilizing a trapped air bubble.
Figure 6:
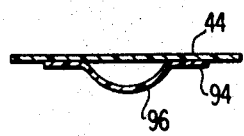
FIG. 6 is a cross-sectional view taken along the lines 6—6 of FIG. 5.

FIG. 5 is a further modification for providing a return of the roller cluster into engagement with the fixed stop 50 upon the equalization of air pressure on opposite sides of the cluster. In this modification, the belt 44 may be provided with a superimposed strip 94 adjacent the end of the belt which is disposed in contact with the upper plate 30 when the roller cluster is disposed against the fixed stop 50. The strip 94 may be secured about its periphery to the belt 44 and is provided with a raised central portion 96 which encloses a trapped air bubble. Thus, when the roller cluster moves to the right as viewed in FIG. 5, part of the raised portion 96 of the strip 94 will be flattened, thereby increasing the pressure of the air within the remaining part of the raised portion, since the raised portion becomes smaller as the roller cluster moves to the right. On equalization of the air pressured on opposite sides of the roller cluster, as described above, the air pressure within the raised portion 96 will tend to expand the portion 96 thereby forcing the roller cluster to the left into engagement with the fixed stop 50 as shown in FIG. 5.

Figure 7:
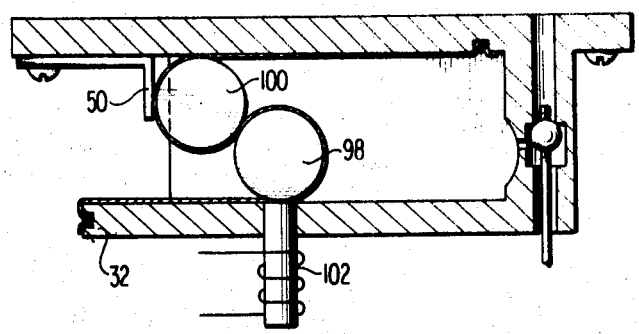
FIG. 7 is a view similar to FIG. 3 showing a modified form of cluster control utilizing an electro-magnet.

In FIG. 7, either one or both of the rollers 98, 100 may be made of ferric material and an electromagnet 102 may be mounted in the lower plate 32 adjacent the position of the roller 98 when the cluster is disposed in engagement with the fixed stop 50. Thus, when the air pressure is equalized on opposite sides of the roller cluster in the manner described above, the electromagnet 102 will be energized by any suitable means (not shown) thereby providing an attractive magnetic force for the ferric roller or rollers to cause the same to move to the left into engagement with the fixed stop 50. By the same token, 102 can be moved to the right thereby causing the valve to open. A unit can also have two magnets, one for opening and the other for closing.

Figure 8:
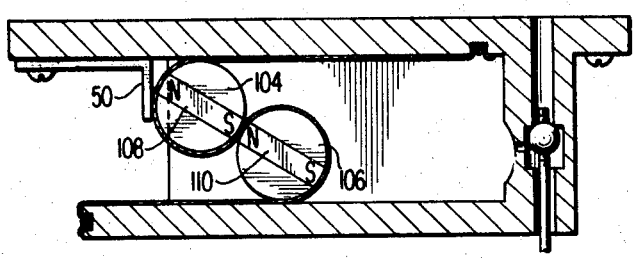
FIG. 8 is a view similar to FIG. 3 showing modified form of cluster control utilizing permanent magnets in each roller.

The modification of FIG. 8, utilizes plastic rollers 104 and 106 having permanent magnets 108 and 110 respectively imbedded therein, such that opposite poles will be disposed adjacent each other when the rollers are disposed in engagement with the fixed stop 50. During the shifting of the roller cluster to the right, as viewed in FIG. 8, the force of the air pressure to the left of the cluster will be sufficient to overcome the magnetic force between the permanent magnets 108 and 110, but upon equalization of the pressures on opposite sides of the cluster, the magnetic force between the opposite poles of the electromagnets 108 and 110 will cause the rollers 104 and 106 to return to their position adjacent the fixed abutment 50.

Figure 9:
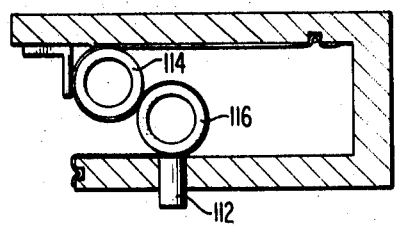
FIG. 9 is a view similar to FIG. 3 showing a modified form of cluster control utilizing hollow metallic rollers and a permanent magnet in the guideway.

FIG. 9 presents a modification very similar to the modification shown in FIG. 7, with the exception that a permanent magnet 112 is utilized instead of the electromagnet 102. In this embodimnet, the rollers 114 and 116 are constructed of ferric material and may be formed as hollow cylindrical members to reduce the weight of the rollers.

Figure 10:
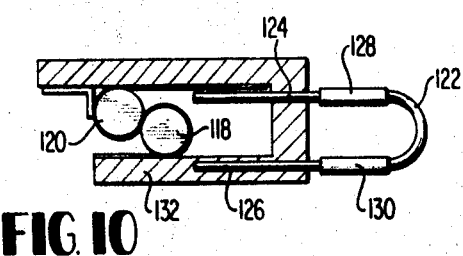
FIG. 10 is a view similar to FIG. 7 showing a modified form of electro-magnet cluster control.
Figure 11:
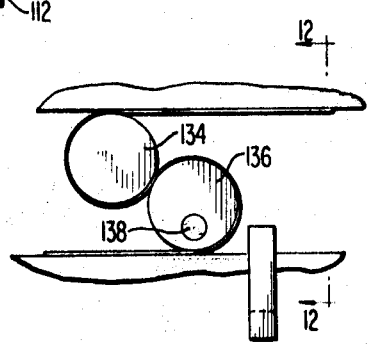
FIG. 11 is a view similar to FIG. 12 showing a still further modified arrangement for electro-magnetic cluster control.
Figure 12:
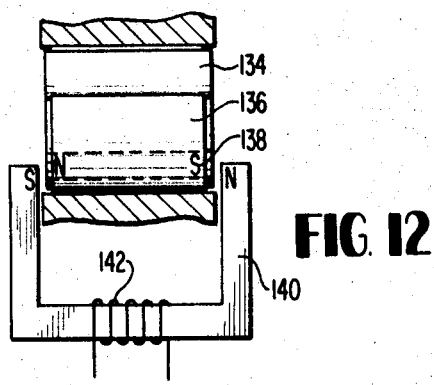
FIG. 12 is a sectional view taken along the line 12—12 of FIG. 11.

FIGS. 10 through 12 show arrangements for controlling the movements of the rollers without the assistance of air pressure. In FIG. 10 the lower roll 118 is made of ferric material and the roller 120 is made of plastic material. A U-shaped magnetizable core 122 is provided with an upper leg 124 and a lower leg 126 which may be magnetized by energization of coils 128 and 130. Upon energization of the coils, the cluster will be drawn to the right. Returning to the left on removing of current can be done by any of the previously described methods of returning. The lower roller 118 is prevented from contacting the upper leg 124, due to the tension of the belt which will maintain the roller 118 in engagement with the lower plate 132 of the housing. In FIG. 11, two plastic rollers 134 and 136 are provided and a permanent magnet 138 or a core of soft magnetic material is embedded eccentrically within the roller 136 parallel to the longitudinal axis thereof. A U-shaped magnetizable core 140 is disposed with the legs thereof adjacent opposite ends of the permanent magnet 138. A coil 142 is wrapped about the core 140 and the direction of the flow of current through the coil will dictate the movement of the rollers. Thus, upon the flow of current through the coil in one direction, opposite poles will be disposed adjacent each other as shown in FIG. 12, thereby attracting the cluster to the right as viewed in FIG. 11 to align the permanent magnet 138 with the arms of the core 140. Upon reversnig the flow of current like poles will be disposed adjacent each other thereby repelling the rolling cluster to the left as viewed in FIG. 11.

Figure 13:
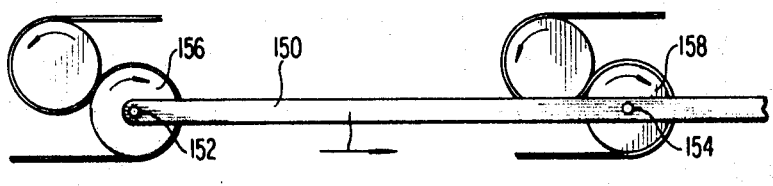
FIG. 13 is a schematic view showing an arrangement for connecting multiple cluster units in tandem.
Figure 14:
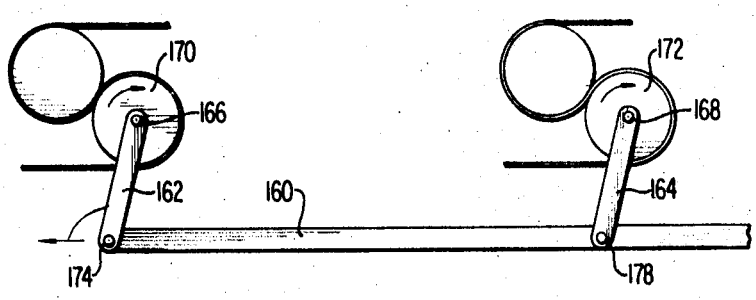
FIG. 14 is a schematic view showing a modified arrangement for connecting multiple cluster units in tandem.

FIGS. 13 and 14 show a schematic arrangement for connecting two roller clusters together for tandem movement in the same direction. In FIG. 13, a connecting bar 150 is journaled on the stub shafts 152 and 154 which are coaxial with the axis of rotation of the rollers 156 and 158, both of which rotate in the same direction. Thus, upon movement of the roller cluster containing roller 156 in the direction of the arrow, the roller cluster containing 158 will simultaneously move an equal distance in the direction of the arrow.

In FIG. 14 the connecting bar 160 is pivotably connected to links 162 and 164 which in turn are fixed to stub shafts 166 and 168 which are coaxial with the axis of rotation of the rollers 170 and 172 respectively. Thus, upon moving the arm 160 to the left as shown by the arrow, a corresponding rotation of the rollers 170 and 172 will take place in a clockwise direction. Movement of the arm 160 in either direction can be caused by a number of different means such as solenoids or the like thereby providing a means of opening and closing a plurality of valves simultaneously by means of a reciprocating motion. In those arrangements utilizing mechanical or magnetic motion means it is obvious that side walls such as walls 36 in FIG. 1 are not necessary.

The invention has been particularly shown and described above and it will be understood by those skilled in the art that various changes in form and details may be made therein without departing from the spirit and scope of the invention.

What is claimed is:

1. A value comprising a housing having a pair of planar, parallel side walls, spaced apart top and bottom walls and at least one end wall, a pair of cylindrical rollers mounted in said housing with the axes thereof parallel to each other and perpendicular to said side walls, the sum of the diameters of said rollers being greater than the greatest distance between said top and bottom walls, belt means having a width substantially equal to the distance between said side walls disposed in an S-shaped configuration about said rollers and secured under tension at one end of the housing to one of said top and bottom walls and at the other end of the housing to the other of said top and bottom walls to define a freely movable roller cluster, means for moving said cluster back and forth within said housing, port means disposed in one of said top and bottom walls intermediate the ends thereof so as to be uncovered and covered by said belt means as said cluster moves back and forth within said housing.

2. A valve as set forth in claim 1 wherein said means for moving said cluster back and forth within said housing comprise valve means in said one end wall for selectively exposing the side of said cluster forcing said one end wall to air under pressure or atmospheric pressure, means for exposing the opposite side of said cluster to said air under pressure and return means for causing said cluster to move in a direction away from said one end when said air under pressure is applied to both sides of said cluster.

3. A valve as set forth in claim 2 wherein said return means includes arranging said top and bottom walls in a divergent manner from said end wall to the opposite end of said housing whereby upon substantial equalization of air pressures on opposite sides of said cluster the tension of the band will cause said cluster to travel away from said end wall.

4. A valve as set forth in claim 2 wherein said top and bottom walls are parallel to each other and said return means is comprised of a spring means disposed in stressed condition between said belt means and said housing when said cluster is disposed adjacent said end wall under the influence of a greater pressure on the side of said cluster away from said end wall.

5. A valve as set forth in claim 2 wherein said top and bottom walls are parallel to each other and said return means is comprised of magnetic means for attracting said cluster to a position remote from said end wall.

6. A valve as set forth in claim 2 wherein the valve is located in the pressured air chest of a pneumatically operated organ, said chest having openings therein leading to the pipes of an organ, said port means of the valve being disposed in alignment with an opening leading to a pipe.

7. A valve as set forth in claim 6 wherein the end of said housing opposite from said one end wall is open to expose the cluster to the air pressure within said chest.

8. A valve as set forth in claim 6 wherein a valve is located in conjunction with each opening in the chest leading to a pipe and further comprising linkage means connecting the cluster in one valve to the cluster in another valve to provide for conjoint movement thereof.

9. A valve as set forth in claim 1 wherein said means for moving said cluster back and forth within said housing comprise magnetic means.

10. A valve as set forth in claim 9 wherein said magnetic means is comprised of a permanent magnet mounted in one of said rollers and reversible electro-magnetic means adjacent said housing for repelling and attracting said permanent magnet.

References Cited
UNITED STATES PATENTS

| | | | |
|---|---|---|---|
| 2,784,740 | 3/1957 | Stageberg | 137—625.44 |
| 3,024,689 | 3/1962 | Miles et al. | 84—335 |
| 3,536,091 | 10/1970 | Erickson | 137—451X |

RICHARD B. WILKINSON, Primary Examiner

L. R. FRANKLIN, Assistant Examiner

U.S. Cl. X.R.

84—60, 89; 251—25, 30, 65, 129; 137—609